United States Patent
Patil et al.

(10) Patent No.: US 10,263,887 B2
(45) Date of Patent: *Apr. 16, 2019

(54) PROPAGATING FLOW CHARACTERISTICS IN SERVICE FUNCTION CHAINING (SFC) HEADERS

(71) Applicant: Cisco Technology, Inc., San Jose, CA (US)

(72) Inventors: Prashanth Patil, Mountain View, CA (US); K. Tirumaleswar Reddy, Bangalore (IN); Gonzalo Salgueiro, Raleigh, NC (US); James N. Guichard, New Boston, NH (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,253

(22) Filed: Mar. 15, 2018

(65) Prior Publication Data

US 2018/0205643 A1 Jul. 19, 2018

Related U.S. Application Data

(63) Continuation of application No. 15/066,467, filed on Mar. 10, 2016, now Pat. No. 9,954,774.

(51) Int. Cl.
*H04L 12/721* (2013.01)
*H04L 12/725* (2013.01)

(52) U.S. Cl.
CPC .......... *H04L 45/566* (2013.01); *H04L 45/302* (2013.01)

(58) Field of Classification Search
CPC .................................................. H04L 45/566
See application file for complete search history.

(56) References Cited

U.S. PATENT DOCUMENTS

2001/0052012 A1* 12/2001 Rinne ................... H04L 47/10
709/224
2008/0046978 A1 2/2008 Rieger
(Continued)

FOREIGN PATENT DOCUMENTS

WO PCT/EP/2014/070273 * 9/2014 ......... H04L 47/2441

OTHER PUBLICATIONS

Halpern et al. "Service Function Chaining (SFC) Architecture draft-ietf-sfc-architecture-09" Network Working Group; pp. 1-29; Jun. 7, 2015.

(Continued)

*Primary Examiner* — Ronald B Abelson
(74) *Attorney, Agent, or Firm* — Behmke Innovation Group LLC; James Behmke; Stephen D. LeBarron

(57) ABSTRACT

In one embodiment, a service function classifier device determines a classification of a packet using one or more packet classification rules. The device selects a service function path based on the classification of the packet. The device determines one or more traffic flow characteristics based on the classification of the packet. The device generates a service function chaining (SFC) header that identifies the selected service function path and the determined one or more traffic flow characteristics. The SFC header is configured to cause a device along the service function path to forward the encapsulated packet based on the identified service function path and the determined one or more traffic flow characteristics. The device sends the packet along the selected service function path as an encapsulated packet that includes the generated SFC header.

17 Claims, 13 Drawing Sheets

(56) References Cited

U.S. PATENT DOCUMENTS

| | | |
|---|---|---|
| 2008/0117869 A1* | 5/2008 | Freen .................... H04W 28/16 370/329 |
| 2013/0272305 A1 | 10/2013 | Lefebvre et al. |
| 2015/0195197 A1 | 7/2015 | Yong et al. |
| 2016/0119253 A1 | 4/2016 | Kang et al. |
| 2016/0134531 A1 | 5/2016 | Assarpour et al. |
| 2017/0111267 A1* | 4/2017 | Lin et al. |
| 2017/0192806 A1* | 7/2017 | Koat ....................... H04L 12/66 |
| 2017/0302623 A1* | 10/2017 | Bifulco ............... H04L 47/2441 |

OTHER PUBLICATIONS

Quinn et al "Network Service Header draft-quinn-sfc-nsh-07.txt" Network Working Group; pp. 1-43; Feb. 24, 2015.
Wing et al. "PCP Flowdata Option" PCP Working Group; pp. 1-17; Jul. 3, 2013.
Network function virtualization; https://en.wikipedia.org/wiki/Network_function_virtualization; pp. 1-7.
Differentiated Services "https://en.wikipedia.org/wiki/Differentiated_services" pp. 1-6.
Halpern et al. "Service Function Chaining (SFC) Architecture" Internet Engineering Task Force (IETF); pp. 1-32; Oct. 2015.

* cited by examiner

PROPAGATING FLOW CHARACTERISTICS IN SERVICE FUNCTION CHAINING (SFC) HEADERS

RELATED APPLICATIONS

This application is a Continuation application of U.S. patent application Ser. No. 15/066,467, filed Mar. 10, 2016 entitled: "PROPAGATING FLOW CHARACTERISTICS IN SERVICE FUNCTION CHAINING (SFC) HEADERS," by Patil et al., the contents of which are herein incorporated by reference.

TECHNICAL FIELD

The present disclosure relates generally to computer networks, and, more particularly, to propagating flow characteristics in service function chaining (SFC) headers.

BACKGROUND

Network Function Virtualization (NFV) is becoming a key driver and architecture in many large networks for both service providers and enterprises. Generally, NFV entails virtualizing certain network functions that would traditionally be implemented as separate network appliances. For example, NFV may virtualize the functions of firewalls, accelerators, intrusion detection and/or prevention devices, load balances, or the like.

NFV implementations often employ service function chains, to control which functions/services are applied to network traffic. For example, a particular service function chain may dictate that traffic should be sent through a firewall service function, then through a network address translation (NAT) service function, and finally through a load balancer service function, before being sent on to its destination.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
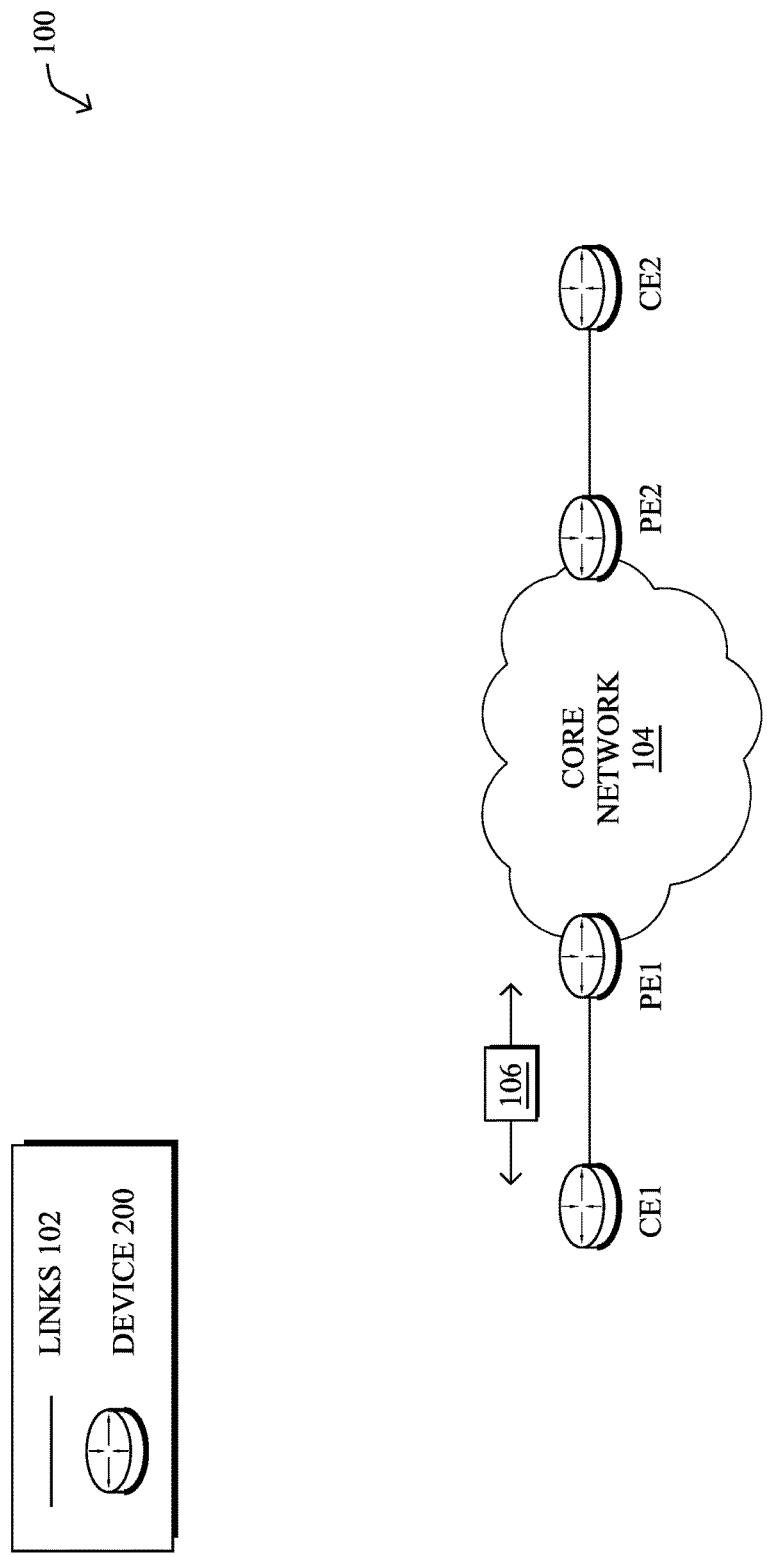
FIG. 1 illustrates an example communication network.

According to one or more embodiments of the disclosure, a service function classifier device determines a classification of a packet using one or more packet classification rules. The device selects a service function path based on the classification of the packet. The device determines one or more traffic flow characteristics based on the classification of the packet. The device generates a service function chaining (SFC) header that identifies the selected service function path and the determined one or more traffic flow characteristics. The SFC header is configured to cause a device along the service function path to forward the encapsulated packet based on the identified service function path and the determined one or more traffic flow characteristics. The device sends the packet along the selected service function path as an encapsulated packet that includes the generated SFC header.

In further embodiments, an apparatus is disclosed that includes one or more network interfaces to communicate with a network. The apparatus also includes a processor coupled to the network interfaces and configured to execute one or more processes. The apparatus further includes a memory configured to store a process executable by the processor. When executed, the process is operable to receive a packet, wherein the packet is encapsulated using a service function chaining (SFC) header. The process is further operable to identify a service function path and one or more traffic flow characteristics from the SFC header. The process is additionally operable to determine a quality of service (QoS) requirement for the packet based on the one or more traffic flow characteristics. The process is also operable to send the packet to a particular service function based on the QoS requirement for the packet.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

FIG. 1 is a schematic block diagram of an example computer network 100 illustratively comprising nodes/devices 200, such as a plurality of routers/devices interconnected by links or networks, as shown. For example, customer edge (CE) routers (e.g., CE1 and CE2) may be interconnected with provider edge (PE) routers (e.g., PE1 and PE2, respectively), to communicate across a core network, such as an illustrative core network 104. Core network

104 may be a Multi-Protocol Label Switching (MPLS) network or, alternatively, any other form of network (e.g., Internet-based, etc.).

Data packets 106 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 2:
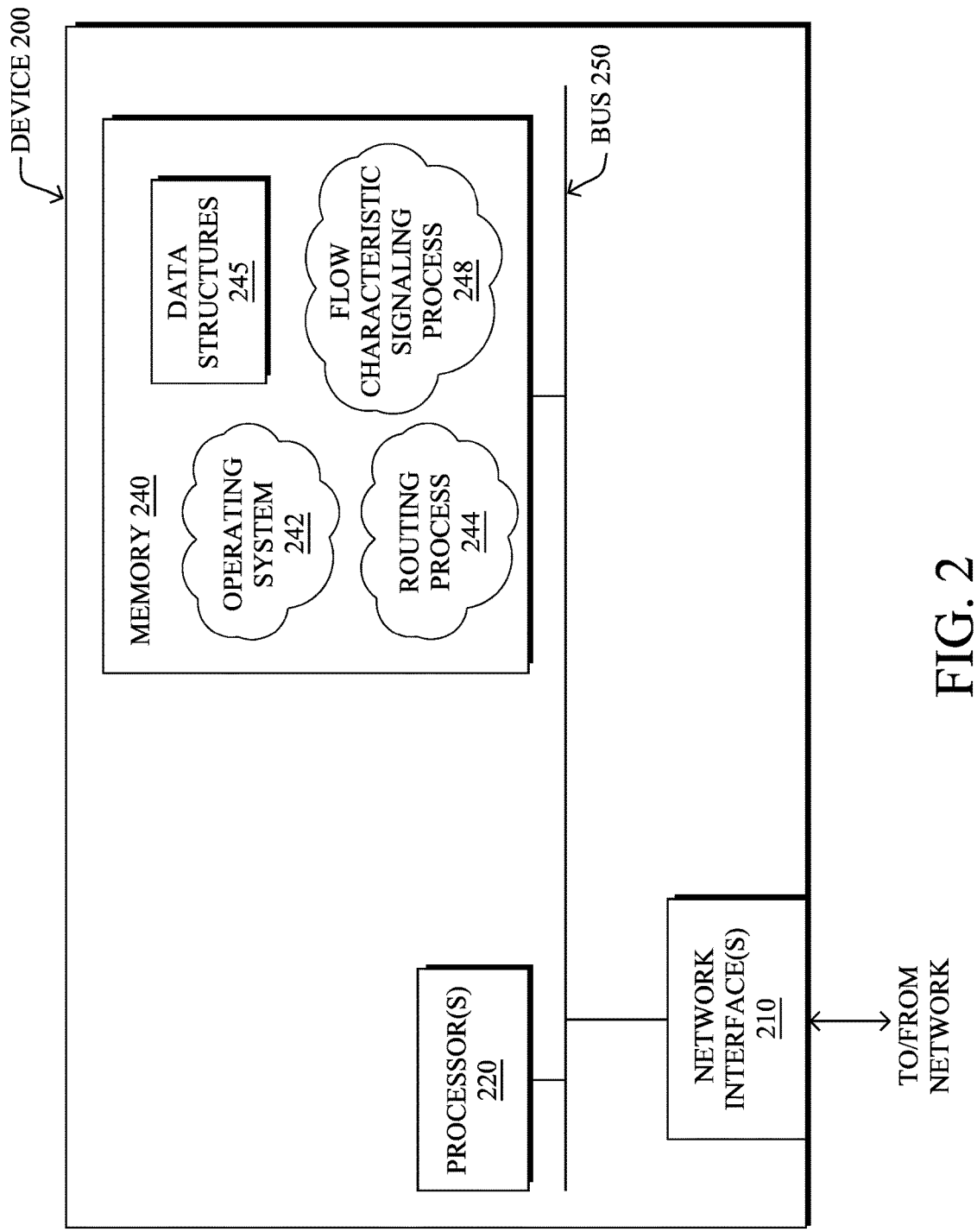
FIG. 2 illustrates an example network device/node.

FIG. 2 is a schematic block diagram of an example node/device 200 that may be used with one or more embodiments described herein, e.g., as any of the routers of network 100, or any other computing device that supports the operations of network 100 (e.g., switches, servers, etc.). Device 200 comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may include a routing process 244 and/or a traffic flow characteristic signaling process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP) (e.g., in conjunction with process 248), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

In further embodiments, routing process 244 may be operable to implement a Service Function Chaining (SFC) architecture. For example, details regarding such an architecture can be found in the Internet Engineering Task Force (IETF) request for comments (RFC) 7665 entitled, "Service Function Chaining (SFC) Architecture" by J. Halpern et al., which is hereby incorporated by reference. In general, SFC facilitates the use of network services and provides for network location techniques to locate the device(s) that support these services. Example services may include, but are not limited to, caching services, firewall services, anti-intrusion services, malware detection services, deep packet inspection (DPI) services, acceleration services, load balancing services, lawful intercept (LI) services, optimization services, etc. In particular, a service function chain comprises an ordered set of services that may be provided to network traffic based on the classification of the traffic.

As part of the SFC architecture, a service function path (SFP) may be defined that indicates to which service functions a certain packet must be sent (e.g., which services are to perform their respective functions on the packet). The packet/frame may then be encapsulated, to include an indication of the specific SFP. Of note is that SFC encapsulation is used solely to include data plane context information and is not used for purposes of network packet forwarding. In particular, a network service header (NSH) may be added to a packet or frame, to convey metadata and service path information that may be used to create the service plane. For transport, the NSH and packet may be encapsulated in an outer header. Details regarding an NSH protocol header can be found in the IETF draft entitled, "Network Service Header," by P. Quinn et al., the contents of which are hereby incorporated by reference.

For a given SFC, there can be a variable number of SFPs and a variable number of Rendered Service Paths (RSPs). Related to the concept of an SFP, an RSP refers to the actual points in the network to which a packet travels. In some cases, an SFP may be constrained to such a degree that the SFP also identifies the actual locations. However, in many cases, an SFP is less constrained, as a service chain can exist as a group of abstract functions/services. Each of the SFPs/RSPs may include a number of specific instances of service functions, service function forwarders (SFFs), and/or proxies. For example, an RSP may comprise the following chain: Firewall_A - - - NAT_C - - - Load_Balancer_G.

As noted above, the NSH architecture provides the mechanisms for the construction of service chains in a network and the forwarding of traffic through those service chains using network service headers carried within the data plane. The network service headers are imposed on to the original packet/frame through classification. An outer encapsulation used for transport between individual services of the service chain is then pushed on to the packet/frame. Forwarding of packets/frames is achieved at the service plane layer using the NSH headers. Specifically, a Service Path Identifier (SPI) and Service Index (SI) are used for this purpose. A unique SPI is used to identify a given service path instantiation of a service chain, and the SI is initialized to the total number of services within the service chain, and decremented at each service hop as packets/frames traverse through the service path.

Figure 3A:
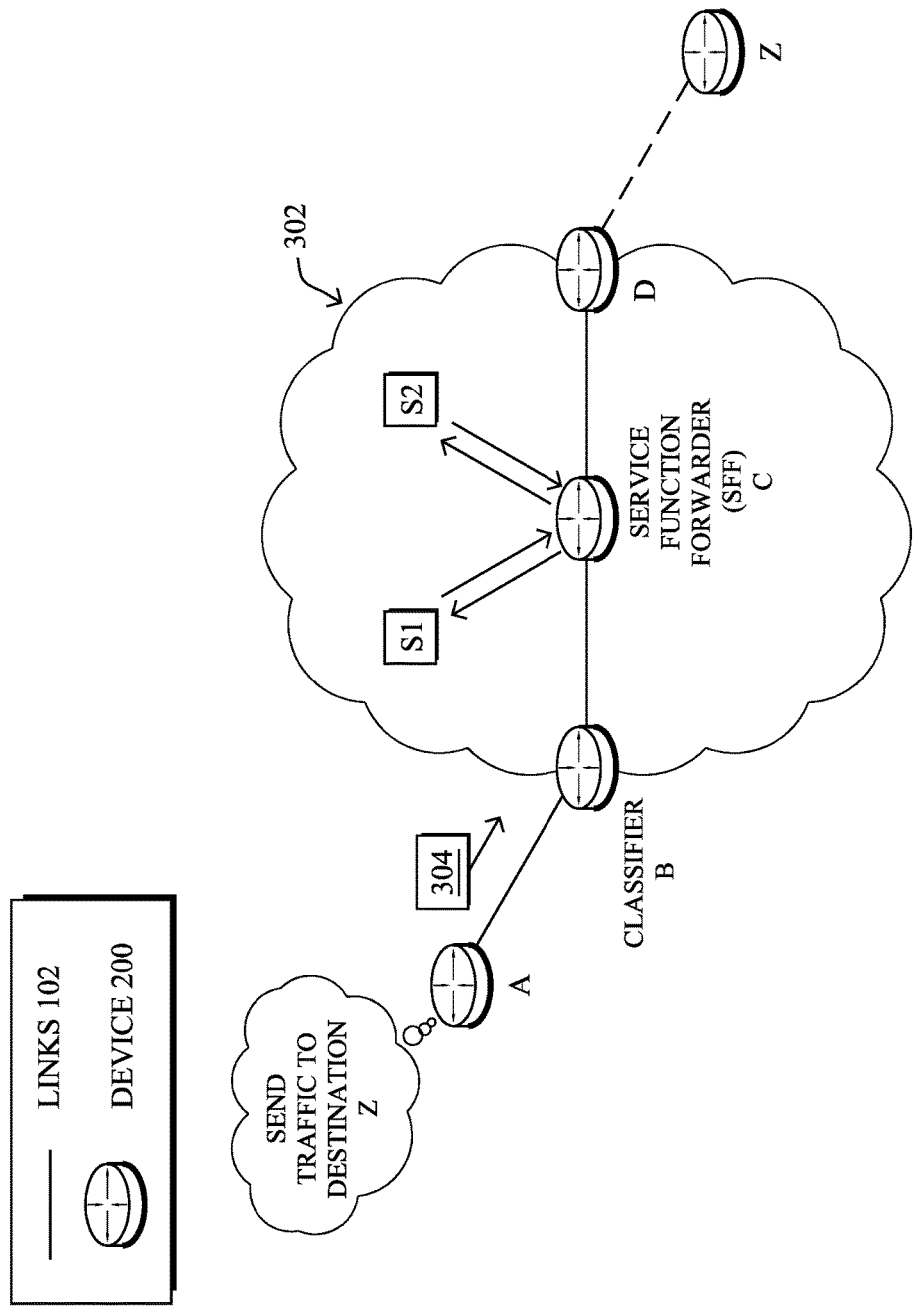
FIGS. 3A-3D illustrate examples of service function paths (SFPs) being used to convey traffic.

Referring now to FIGS. 3A-3D, examples are shown of SFPs being used to convey traffic, according to various embodiments. As shown in FIG. 3A, assume that nodes A-E exist along a path that traverses network portion 302. In particular, assume that node A is to send traffic to node E via the path shown. Further, assume that node B is an SFC classifier and that node C is an SFF configured to forward packets to any number of service functions (e.g., service functions S1, S2, etc.). For example, S1 may be a content filtering service and S2 may be a NAT service. In some cases, S1 and S2 may be provided by separate network devices than that of SFF C. However, as service functions in an SFC can be virtualized, service functions S1 and S2 can also be implemented locally on node C, in other implementations. As would be appreciated, the nodes shown are presented in a simplified manner and the path between nodes A and E may comprise any number of intermediary nodes and/or service functions.

To establish an SFP, Open Daylight (ODL), or another similar mechanism, may be used to send appropriate instructions to the various nodes shown. In particular, an SFP may be established by programming the nodes with a unique SPI that identifies the SFP. Further, service function classifier device/node B may also be programmed with classification rules that are used by classifier node B to make SFC decisions based on the different types of user traffic that may be sent via node B. For example, one classification rule may require only HTTP traffic to pass through content filtering service function S1, whereas other types of traffic may not require this service.

For purposes of illustration only, assume that node A sends user traffic 304 towards a destination node Z. In various embodiments, user traffic 304 may include any number of packets that are part of a traffic flow. For example, in some cases, user traffic 304 may be a multimedia traffic flow (e.g., conveying audio and/or video) and may be multiplexed (e.g., on the same 5-tuple). User traffic 304 may also be unidirectional (e.g., only from node A to node Z) or multidirectional, in various cases.

Figure 3B:
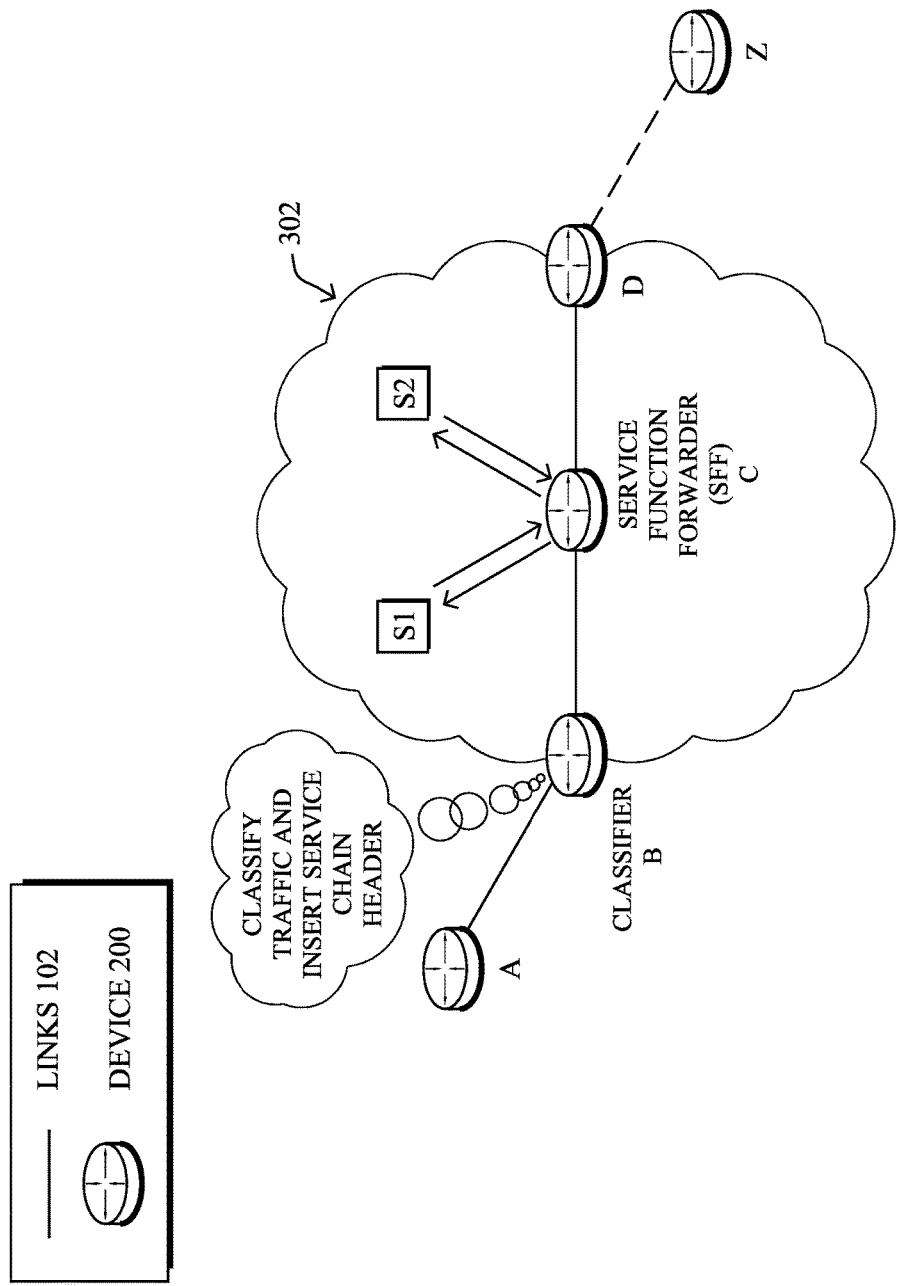

As shown in FIG. 3B, classifier node B may classify traffic 304 according to its programmed classification rules. For example, classifier node B may classify traffic 304 by its type (e.g., the application associated with the traffic, etc.), its address information (e.g., the address and/or port of the source and/or destination device), or any other information that may be used to select a particular SFP for the traffic. Based on the classification, classifier node B may then construct an SFC header and encapsulate traffic 304 using the header. For example, classifier node B may select the SPI and SI associated with the classification and, in turn, may construct an NSH header for traffic 304 that indicates the selected values.

Figure 3C:
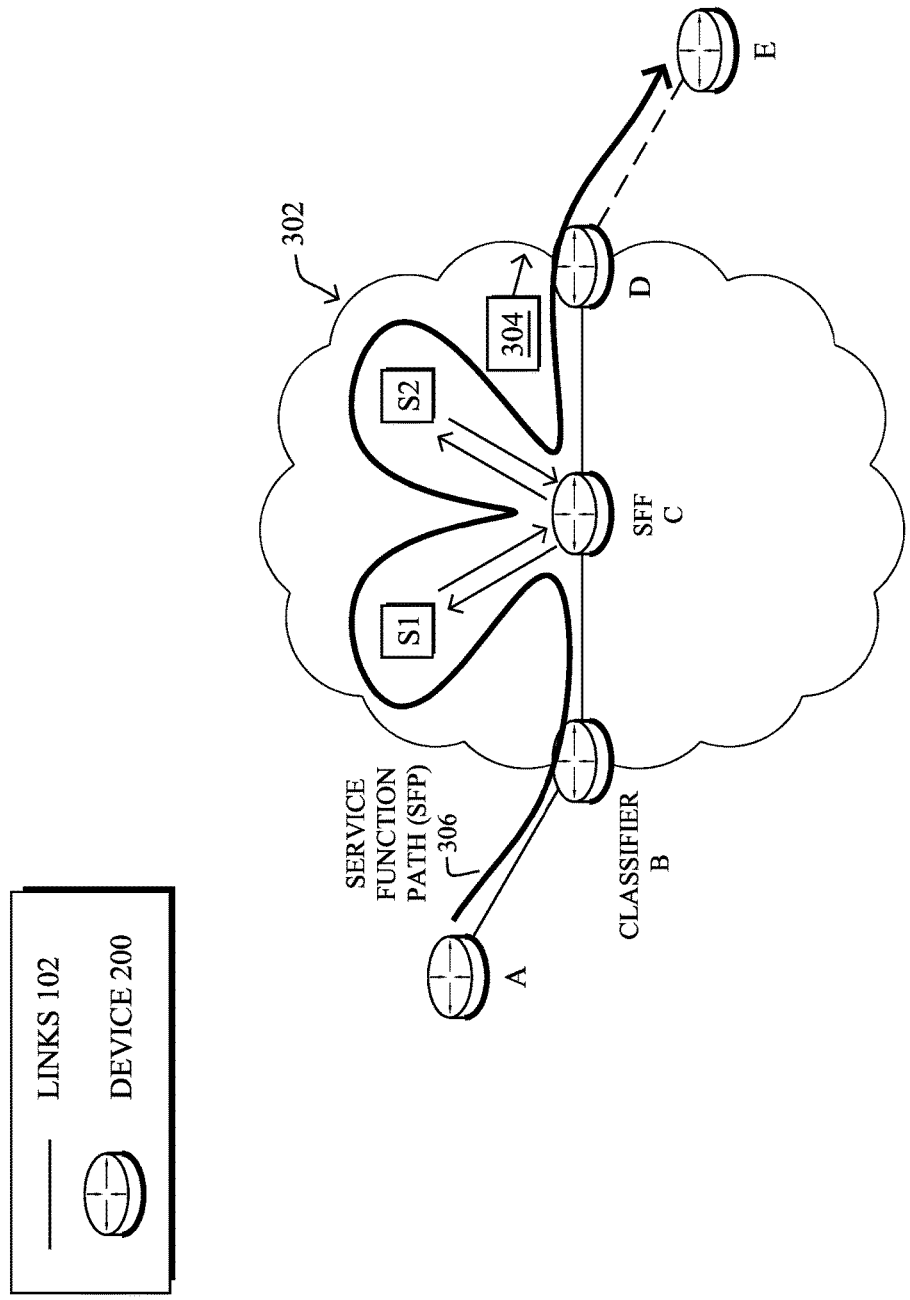

A first SFP 306 that may be selected by classifier B for traffic 304 is shown in FIG. 3C. In particular, the NSH header added to traffic 304 may indicate that traffic 304 should be sent to both service functions S1 and S2 for processing. Notably, in response to receiving an NSH-encapsulated packet, SFF C may determine that traffic 304 should be sent first to service function S1 for processing, then on to service function S2, before being forwarded towards its intended destination, node E.

Figure 3D:
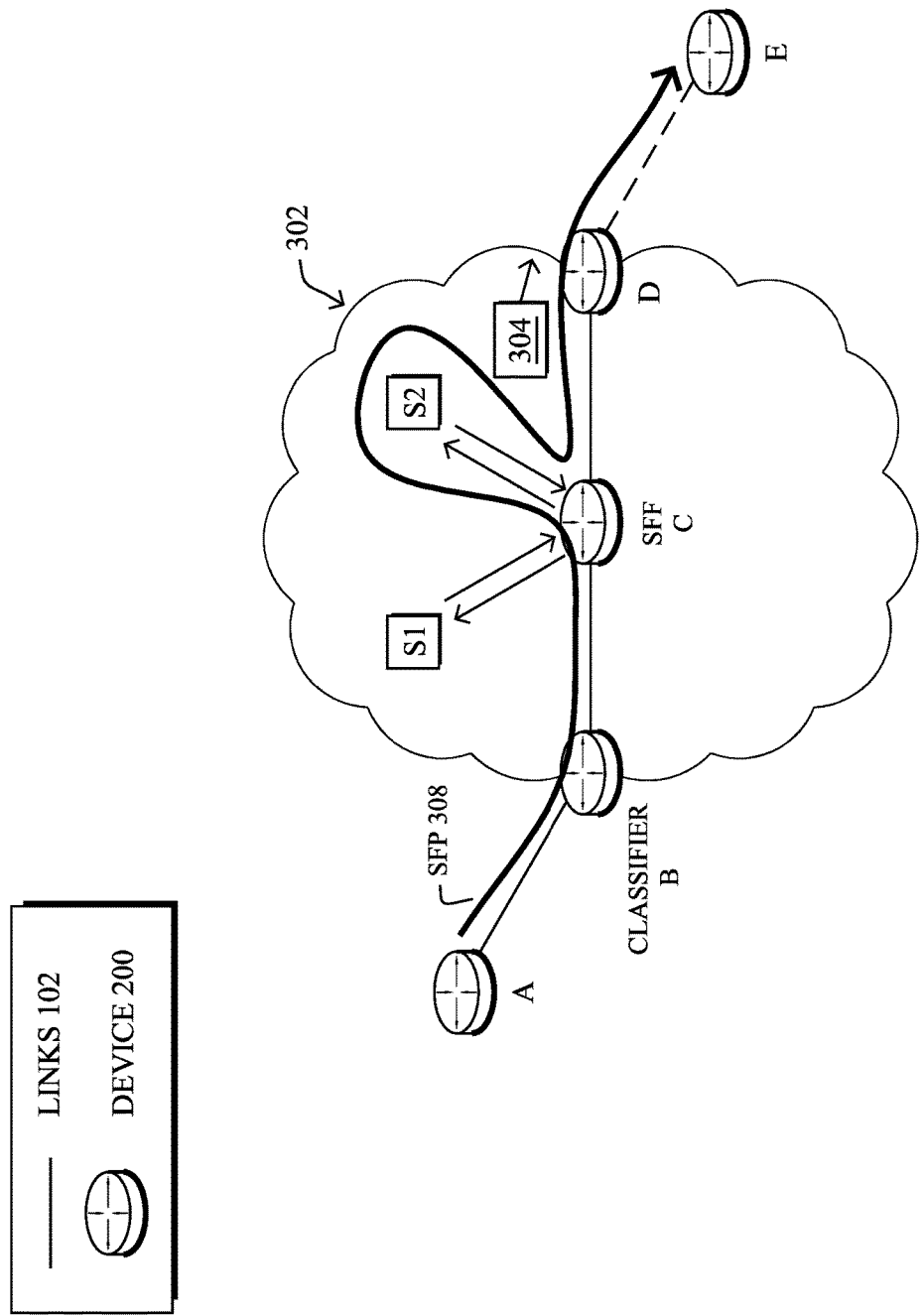

As shown in FIG. 3D, traffic 304 may traverse an alternate SFP 308, based on the NSH header inserted into traffic 304. For example, while SFP 306 includes both service functions S1 and S2, SFP 308 instead only includes service function S2. Thus, the classification of traffic 304 may affect which SFP, if any, the traffic will traverse before delivery to its destination.

Figure 4:
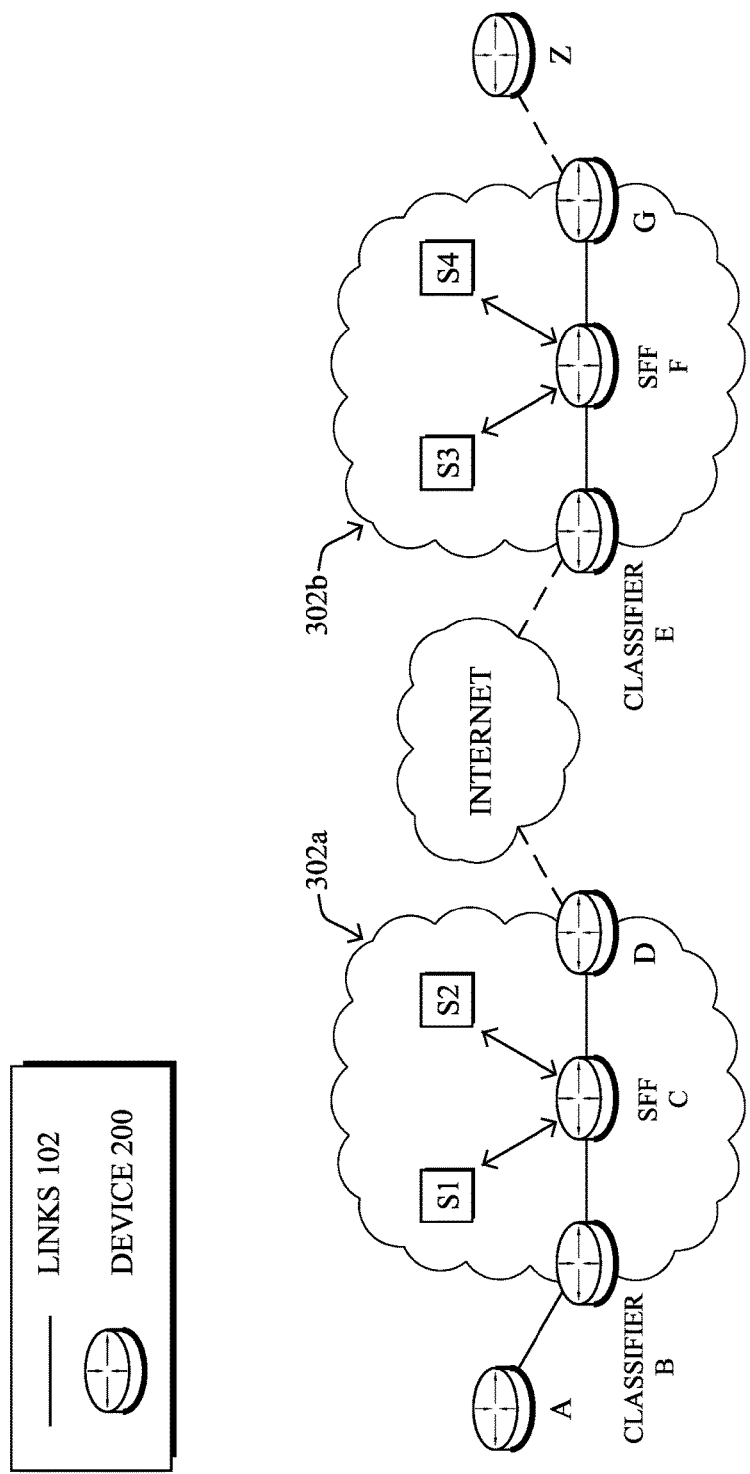
FIG. 4 illustrates an example of service function chaining (SFC) across different domains.

Referring now to FIG. 4, an example is shown of different domains 302a, 302b between source node A and destination node Z, according to various embodiments. For example, domains 302a, 302b may be differentiated services (DiffServ) domains or other administrative domains in communication with one another by an intermediary network, such as the Internet.

Certain user traffic may have quality of service (QoS) requirements, to ensure that the user experience is not impinged upon by the network. For example, real-time media data (e.g., audio and/or video) may have certain requirements in terms of delay, jitter, packet loss, etc. Notably, many applications have low tolerances to jitter and packet loss, while exhibiting inelastic flow behavior. For example, assume that user traffic 304 is a multimedia stream that is highly susceptible to jitter, delays, and packet loss.

To ensure that the QoS requirements of a traffic flow are met, nodes along a path may enforce policing policies that prioritize certain traffic flows over others. Within a single DiffServ domain, it is relatively straightforward to enforce QoS policies. For example, the QoS requirements of traffic 304 may be met within domain 302a by marking the packets of traffic 304 with appropriate Differentiated Services Code Point (DSCP) values. By doing so, receiving devices/nodes in domain 302a can provide differentiated service to packets of different traffic flows. In other words, based on their DSCP markings, preference may be given to a packet of one type of traffic flow over that of another.

An issue arises when attempting to ensure that the QoS requirements of network traffic are met across multiple DiffServ domains. Notably, DSCP values are site specific, with each site selecting its own code points for each QoS level. In addition, DSCP markings are often modified or removed at various points in a network. Thus, DSCP markings applied to traffic 304 within domain 302a may not be usable or even present within domain 302b.

Propagating Traffic Flow Characteristics in SFC Headers

The techniques herein allow traffic flow characteristics to be signaled as part of an SFC mechanism. In some aspects, the traffic flow characteristics may be propagated with the packet as part of an SFC header, such as an NSH-based header. Service functions and forwarders along the service function path can then prioritize and provide differentiated services for such flows, thus offering a desired throughput and user-experience. In addition, the techniques herein allow QoS requirements of the traffic to be met across multiple DiffServ or admin domains between the sender and receiver of the traffic. Such signaling is particularly useful for long-lived flows such as interactive audio/video, streaming video etc., as well as other real-time communications.

Specifically, according to one or more embodiments of the disclosure as described in detail below, a service function classifier device determines a classification of a packet using one or more packet classification rules. The device selects a service function path based on the classification of the packet. The device determines one or more traffic flow characteristics based on the classification of the packet. The device generates a service function chaining (SFC) header that identifies the selected service function path and the determined one or more traffic flow characteristics. The SFC header is configured to cause a device along the service function path to forward the encapsulated packet based on the identified service function path and the determined one or more traffic flow characteristics. The device sends the packet along the selected service function path as an encapsulated packet that includes the generated SFC header.

Illustratively, the techniques described herein may be performed by hardware, software, and/or firmware, such as in accordance with the traffic flow characteristic signaling process 248, which may contain computer executable instructions executed by the processor 220 (or independent processor of interfaces 210) to perform functions relating to the techniques described herein, e.g., in conjunction with routing process. For example, the techniques herein may be treated as extensions to conventional protocols, such as the various SFC protocols and, as such, may be processed by similar components understood in the art that execute those protocols, accordingly.

Operationally, an example SFC header 500 is shown, according to various embodiments. As shown, header 500 may be applied to a packet that is to be sent along a given SFP/RSP (e.g., based on one or more classification rules of a classifier device). In turn, a node along the path may analyze header 500 of the encapsulated packet, to determine which service functions, if any, are to process the packet and in what order. In some embodiments, the packet may be further encapsulated after application of header 500, e.g., according to the various routing protocols available. For illustrative purposes only, header 500 is depicted as an NSH-based header. However, in other embodiments, header 500 may conform to any other SFC protocol.

As shown, header 500 may include base header bits/fields 502-514. Particularly, version field 502 may indicate the NSH version and may be set to 0x0, if the initial version of NSH is used. O bit 504 may indicate whether or not header 500 is an operations, administration and management (OAM) packet. C bit 506 may indicate whether header 500 includes a critical type-length-value (TLV). Header 500 may further include any number of reserved bits 508 that may be used, e.g., in subsequent versions of NSH. Length field 510 may be a four byte word that indicates the total header length, including any optional TLVs used. MD Type field 512 may be set to indicate whether the header includes fixed-length context headers or, alternatively, variable length context information. Finally, header 500 may include a next protocol field 514 that indicates the type of the protocol originating the packet. For example, next protocol field 514 may be set to 0x1 to indicate that the packet was originated by IPv4, may be set to 0x2 to indicate that the packet was originated by IPv6, etc.

Header 500 may also include service path header fields 516-518. Service Path ID (SPI) field 516 may uniquely identify a service function path. For example, SPI field 516 may include 24 bits that can be set to represent a particular service path. Service index (SI) field 518 may indicate the number of services along the path indicated by field 516 that still need to process header 500. As header 500 is processed during transit by a service function, SI field 518 may be decremented, accordingly.

Header 500 may further include any number of context header fields 520. In accordance with NSH, the number and size of fields 520 may be a function of the value set in MD Type field 512. Notably, if MD Type field 512 is set to be 0x1, context header fields 520 may comprise four mandatory context headers, each having four bytes. However, if MD Type field 512 is set to be 0x2, header 500 may include zero or more context header fields 520. In such a case, any metadata included in context header fields 520 may further indicate type-length-value (TLV) information such as the class, type, and length of the metadata.

According to various embodiments, a classifier device applying header 500 to a packet may insert traffic flow characteristic information into context header field(s) 520. Generally, the flow characteristic information may be any information that can be used to provide differentiated services to different traffic flows along the SFP/RSP. For example, the traffic flow characteristic information may include, but is not limited to, any or all of the following:

Upstream Delay Tolerance
Upstream Loss Tolerance
Upstream Jitter Tolerance
Downstream Delay Tolerance
Downstream Loss Tolerance
Downstream Jitter Tolerance
Upstream Minimum Bandwidth
Downstream Minimum Bandwidth
Upstream Maximum Bandwidth
Downstream Maximum Bandwidth
Service Class Information The above tolerances may be represented on a predefined scale, to allow a receiving node/device to prioritize traffic. For example, a value of '1' may indicate that the packet has very low tolerance for upstream jitter, whereas a value of '4' may indicate that the packet has a high tolerance for upstream jitter.

In some embodiments, service class information included in context header field 520 may be used to represent an aggregate of different tolerance and/or bandwidth parameters. For example, a 'telephony' service class may indicate that the traffic has low tolerances in terms of loss, delay, and jitter. Conversely, a 'high-throughput data' service class may indicate that the traffic has low tolerance for loss, medium to high tolerance for delays, and high tolerance to jitter. Example service classes may include, but are not limited to, telephony, signaling, multimedia conferencing, multimedia streaming, real-time interactive, broadcast video, low-latency data, OAM, high-throughput data, low-priority data, and standard data.

As would be appreciated, the amount of flow characteristics included in header 500 may be selected as desired. In some embodiments, MD Type field 512 may be set to 0x1, to include a minimalistic set of characteristics in fixed-length context header fields 520. Such information can be processed directly in hardware by a receiving node/device. For example, context header fields 520 may only indicate the flow maximum bandwidth and maximum delay, potentially on a per-service function basis. At the time of setting up the SFP, the total delay budget for all service functions may be understood, allowing the characteristic information to be used to make forwarding decisions. However, in other embodiments, if context header fields 520 are of variable length (e.g., by setting MD Type field 512 to be 0x2), a very rich set of flow characteristics may be included in header 500.

Figure 6A:
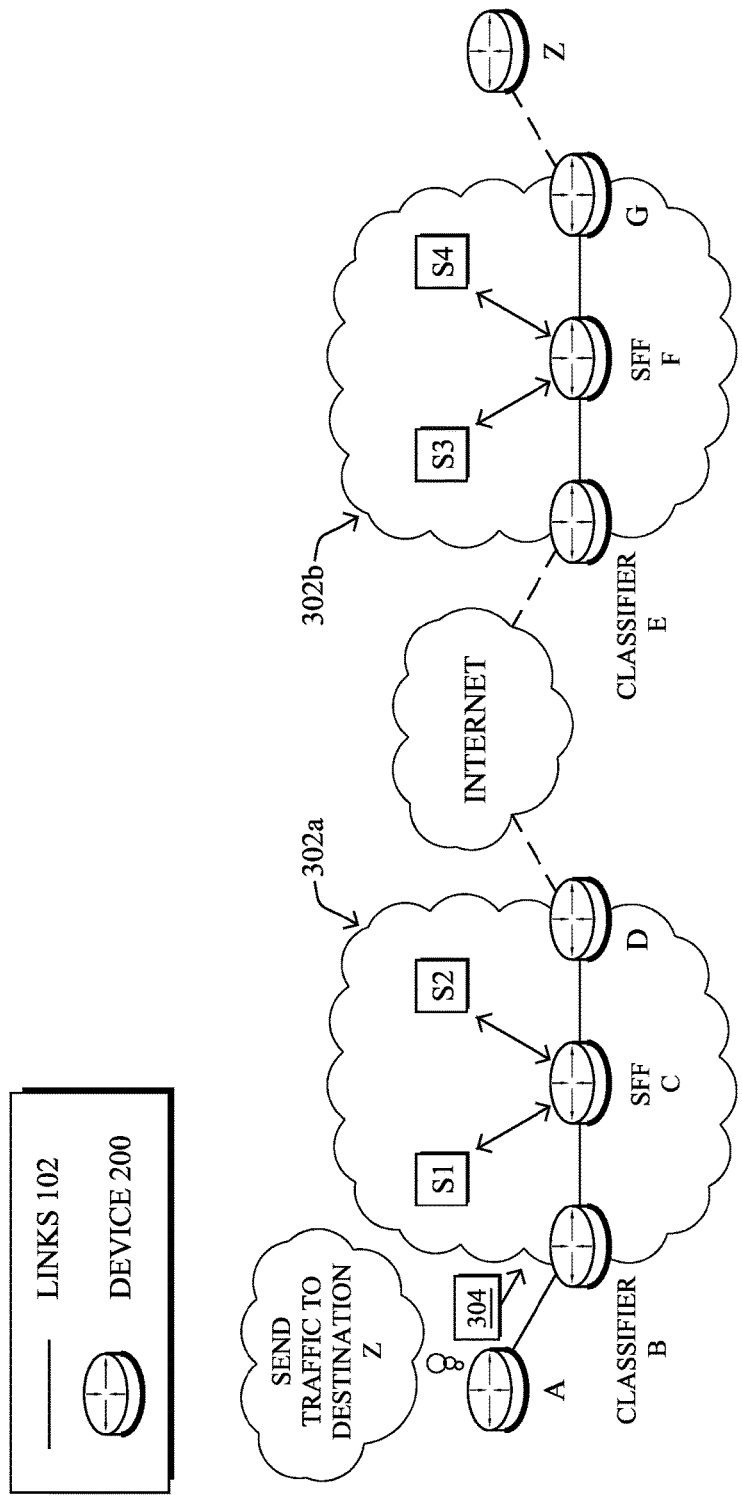
FIGS. 6A-6C illustrate examples of the inclusion of traffic flow characteristic information in an SFC header.
Figure 6B:
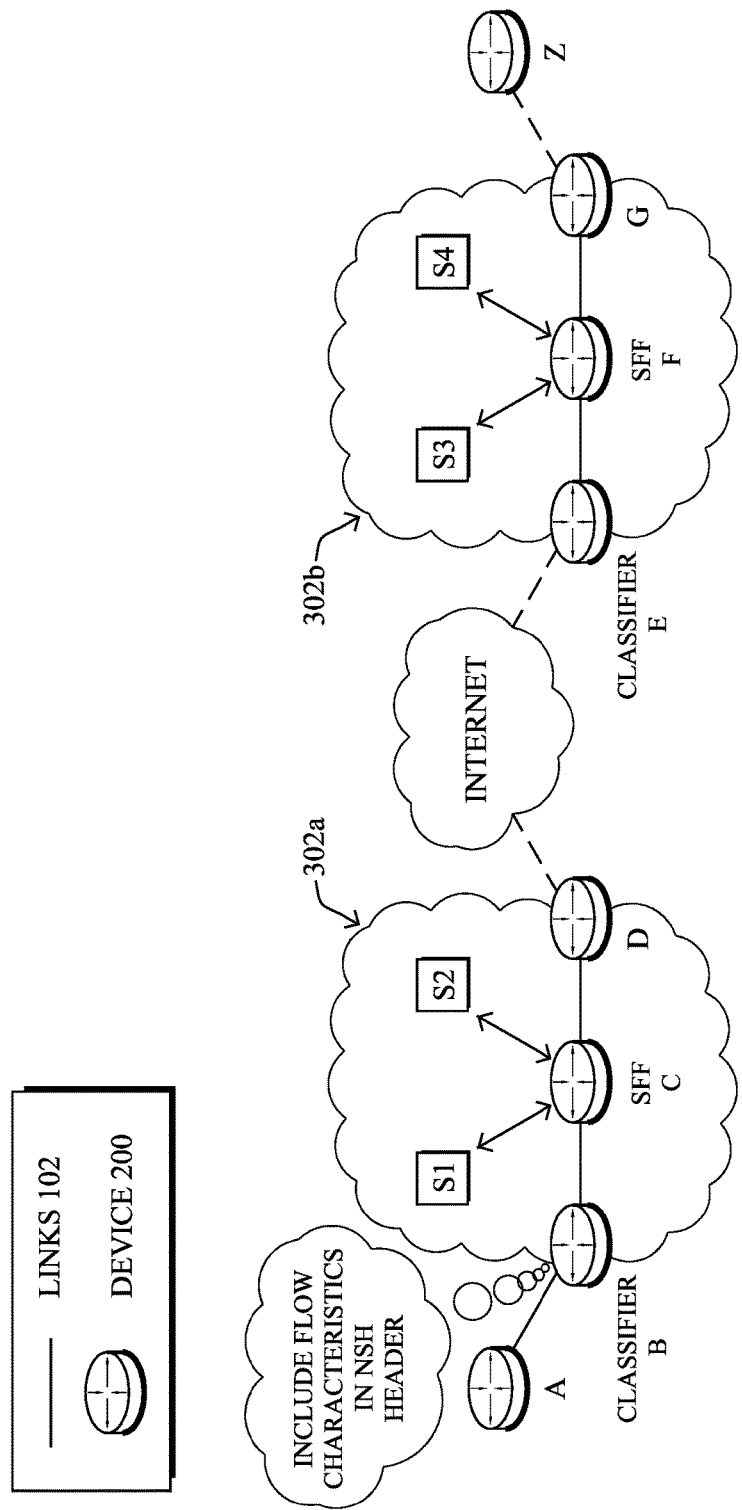
Figure 6C:
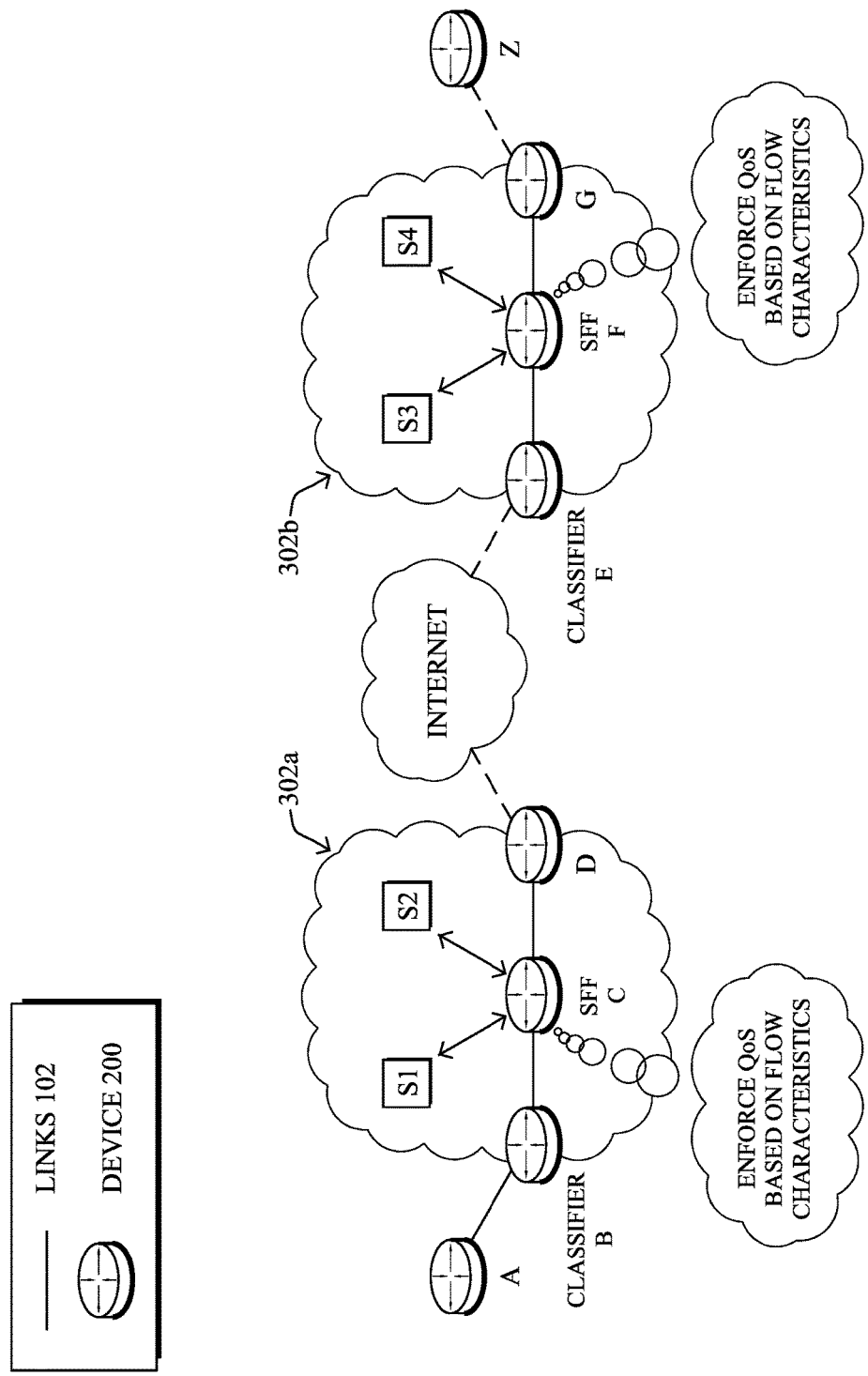

FIGS. 6A-6C illustrate the inclusion of traffic flow characteristic information in an SFC header, according to various embodiments. As shown in FIG. 6A, assume that node A sends traffic 304 to destination node Z via any number of network portions, such as domains 302a and 302b. Also, for purposes of illustration, assume that the SFC nodes/devices shown have been configured to insert and process traffic characteristic information within the SFC header of a packet, in accordance with the techniques herein.

According to various embodiments, as shown in FIG. 6B, classifier device B may inspect a packet in traffic 304, to determine a classification of the packet and the corresponding traffic flow. Based on the classification, classifier device B may select which service function, if any, are to process the packet. Accordingly, classifier device B may determine an appropriate SFP via which the packet should be sent towards the destination node Z. In addition, based on the classification, classifier device B may determine an appropriate set of one or more traffic flow characteristics for the packet. In turn, classifier device B may encapsulate the packet using an NSH-based header that includes the SPI of the selected path and the determined flow characteristics.

In some embodiments, classifier device B may only include traffic flow characteristic information in an SFC header based on the determined type of traffic. For example, classifier device B may not include flow characteristic information in the header of short-lived flows or flows that do not warrant differentiated services. By doing so, this may prevent services functions and nodes along the path from being overwhelmed with flow characteristics.

Figure 5:
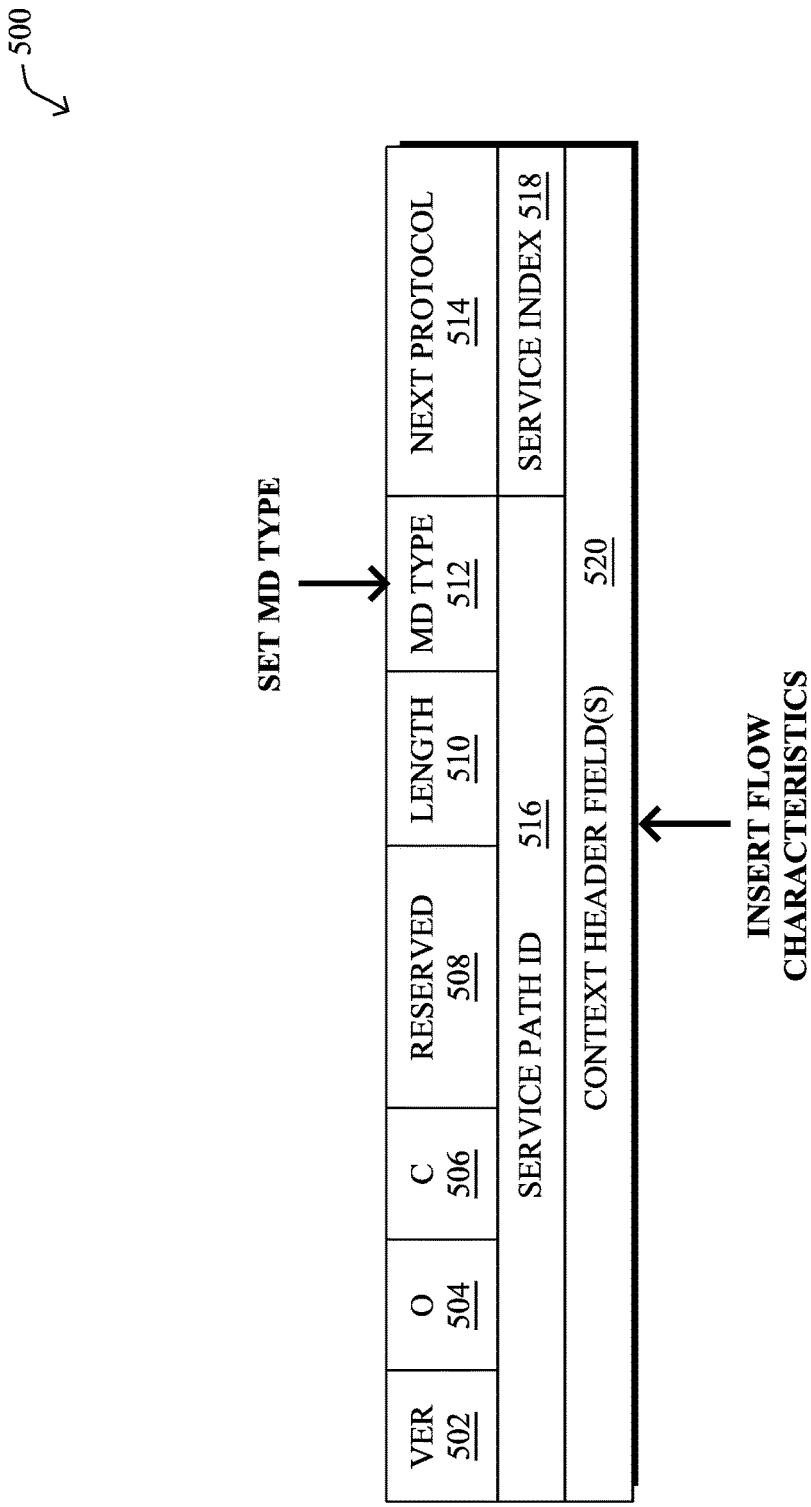
FIG. 5 illustrates an example SFC header.

As shown in FIG. 5C, the nodes/devices along the path between node A and destination node B may use the flow characteristic information included in the NSH-based header of traffic 304 to make decisions regarding the treatment of the packets of traffic 304. Notably, a device that receives such a packet may prioritize the packet based on its flow characteristics and to ensure that the QoS requirements of the packet, if any, are met. For example, as shown, SFFs C and F may base their distribution of traffic flows to service functions S1-S4 on the signaling provided by the NSH-based headers and on the load conditions of service functions S1-S4.

Figure 7:
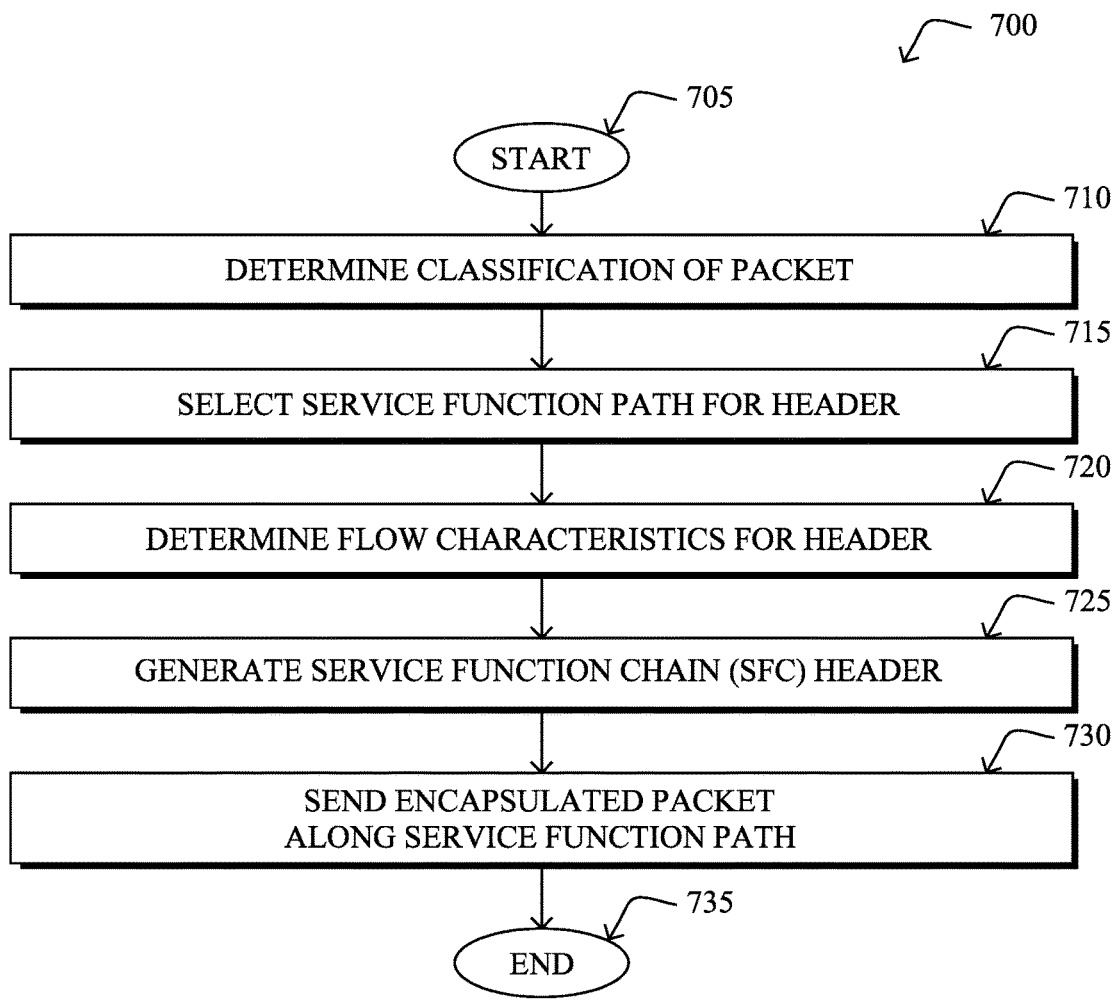
FIG. 7 illustrates an example simplified procedure for including traffic flow characteristic information in an SFC header of a packet.

Referring now to FIG. 7, an example simplified procedure is shown for including traffic flow characteristic information in an SFC header of a packet, according to various embodiments. Procedure 700 may be performed, e.g., by specialized nodes/devices in a network executing stored machine instructions. For example, procedure 700 may be performed by a service function classifier device in a network that implements SFC. Procedure 700 may begin at step 705 and continue on to step 710 where, as described in greater detail above, the device may determine a classification for a packet using one or more classification rules. Such rules may, for example, be based on information regarding the sender and/or receiver of the packet, the actual content of the packet, an application associated with the packet (e.g., conferencing, etc.), or any other information included in the packet.

At step 715, as detailed above, the device may select a service function path (SFP) via which the packet should be sent. In some embodiments, the device may select a unique service path identifier (SPI) based on the classification of the packet for inclusion in an SFC header for the packet. For example, the classifier device may determine that the packet should be sent to an intrusion detection or protection service (IDS/IPS) based on its classification, before being sent to a network address translation (NAT) service function.

At step 720, the device may also determine one or more flow characteristics of the packet for inclusion in the SFC header, as described in greater detail above. Such characteristics may include, in some embodiments, QoS parameters regarding the level of quality required by the traffic that includes the packet. For example, the flow characteristics may indicate that the amount of jitter, packet loss, or delays for the packet should remain below a threshold parameter. In some cases, such a parameter may be on a path-wide basis (e.g., the total amount of packet drops allowed, etc.). Such a parameter may also be on a per-hop or per-service function basis. In one embodiment, a flow characteristic may simply identify a differentiated service class or type of traffic, thereby allowing the receiving device to determine the QoS requirements. For example, if a flow characteristic of the packet identifies the packet as being part of a real-time streaming video, a receiving node/device may determine the appropriate set of QoS requirements for the packet (e.g., in terms of delay, jitter, etc.). In a further embodiment, such a flow characteristic may also indicate whether or not a particular QoS parameter or requirement applies to upstream or downstream portions of the traffic flow.

At step 725, as detailed above, the device may generate an SFC header for the packet. Such a header may indicate both the selected service path for the header, as well as the one or more flow characteristics determined by the device in step 720. In various embodiments, the header may be an NSH-based header or another header that controls the flow of the packet via an SFP.

At step 730, the device may send the packet as an encapsulated packet that includes the generated SFC header, according to various embodiments. In particular, the device may use the generated header to encapsulate the classified packet, prior to sending the packet along the SFP selected in step 715. In some embodiments, the device may perform further encapsulations, such as by encapsulating the packet according to another protocol. Procedure 700 then ends at step 735.

Figure 8:
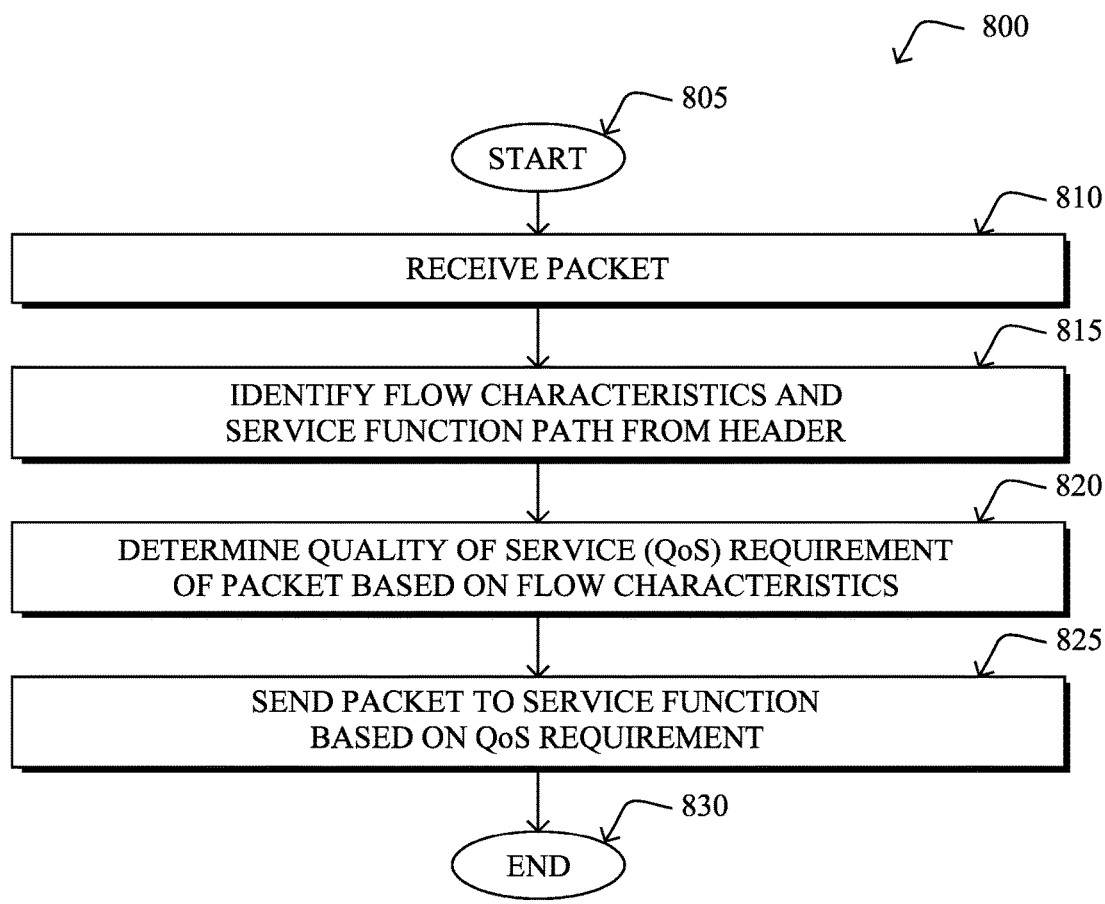
FIG. 8 illustrates an example simplified procedure for processing a packet that includes traffic flow characteristic information in an SFC header.

FIG. 8 illustrates an example simplified procedure for processing a packet that includes traffic flow characteristic information in an SFC header, in accordance with the embodiments herein. Procedure 800 may be performed, e.g., by a specialized networking device that executes stored instructions. For example, procedure 800 may be executed by an SFF or other device along an SFP. Procedure 800 may start at step 805 and continues on to step 810 where, as described in greater detail above, the device may receive a packet that has been encapsulated using an SFC header. For example, the device may receive a packet that includes an NSH-based header.

At step 815, as detailed above, the device may identify one or more flow characteristics of the packet and the SFP from the SFC header of the encapsulated packet. For example, an NSH-based header of the packet may include an SPI that uniquely identifies the SFP. In addition, the header may also include metadata that conveys flow characteristic information regarding the packet's traffic flow (e.g., the type of flow, one or more QoS parameters, etc.).

At step 820, the device may determine one or more QoS requirements of the packet, based on the flow characteristic(s) identified in step 815, as described in greater detail above. For example, the device may determine that the packet should not be sent to a particular service function, if the amount of delay associated with the service function exceeds a maximum delay parameter for the packet. In some embodiments, a flow characteristic may simply indicate the type of traffic of the packet. In such cases, the device may determine the QoS requirements based on the traffic type.

At step 825, as detailed above, the device may send the packet for processing by a service function based on the determined QoS requirement(s) of the packet. For example, the device may send the packet to a particular service function based on the QoS requirements of the packet and on metrics regarding the particular service function. In some embodiments, the device may also prioritize the sending of different packets, based on their QoS requirements. For example, the device may prioritize the sending of one packet over that of another, based on the QoS requirements of their associated traffic flows. Said another way, the device may implement differentiated services based on the flow characteristic(s) included in the SFC headers of the incoming packets. Procedure 800 then ends at step 830.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, allow for flow characteristics to be signaled within an SFC header, such as an NSH-based header. As would be appreciated, this improves upon the functioning of the networking devices by providing differentiated service for both directions of a flow, including flows that cross administrative boundaries (e.g., across DiffServ domains). Both high-priority and low-priority flows can be signaled, so that packets in a low-priority flow can yield to those of a high-priority flow in overload situations, through policing. For example, SFFs can distribute flows to service function instances based on the flow characteristics signaled in an NSH-based header and on the load conditions of the intended service function.

While there have been shown and described illustrative embodiments that provide for signaling flow characteristics using an SFC header, it is to be understood that various other adaptations and modifications may be made within the spirit and scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a service function classifier device, a classification of a packet using one or more packet classification rules;
   selecting, by the device, a service function path based on the classification of the packet;
   determining, by the device, one or more traffic flow characteristics based on the classification of the packet, the one or more traffic flow characteristics including at least quality of service (QoS) parameters associated with the packet as the packet travels along the selected service function path;
   generating, by the device, a service function chaining (SFC) header that identifies the selected service function path and the determined one or more traffic flow characteristics, wherein the one or more traffic flow characteristics are included in one or more context header fields of the SFC header and the SFC header is configured to cause a node along the service function path to forward the encapsulated packet based on the identified service function path and the determined one or more traffic flow characteristics; and
   sending, by the device, the packet along the selected service function path as an encapsulated packet that includes the generated SFC header.

2. The method as in claim 1, wherein the one or more QoS parameters identify one or more of: a bandwidth requirement, a delay requirement, a jitter requirement, or a packet loss requirement.

3. The method as in claim 2, wherein the one or more traffic flow characteristics identify whether the one or more QoS parameters apply to upstream or downstream traffic.

4. The method as in claim 1, wherein the SFC header comprises a Network Service Header (NSH)-based header, and wherein the one or more traffic flow characteristics are included in the NSH-based header.

5. The method as in claim 1, wherein the packet is part of a multiplexed traffic flow.

6. An apparatus, comprising:
   one or more network interfaces to communicate with a network;
   a processor coupled to the network interfaces and configured to execute one or more processes; and
   a memory configured to store a process executable by the processor, the process when executed operable to:
      determine a classification of a packet using one or more packet classification rules;
      select a service function path based on the classification of the packet;
      determine one or more traffic flow characteristics based on the classification of the packet, the one or more traffic flow characteristics associated with quality of service (QoS) parameters associated with the packet as the packet travels along the selected service function path;
      generate a service function chaining (SFC) header that identifies the selected service function path and the determined one or more traffic flow characteristics, wherein the one or more traffic flow characteristics are included in one or more context header fields of the SFC header and the SFC header is configured to cause a node along the service function path to forward the encapsulated packet based on the identified service function path and the determined one or more traffic flow characteristics; and
      send the packet along the selected service function path as an encapsulated packet that includes the generated SFC header.

7. The apparatus as in claim 6, wherein the one or more QoS parameters identify one or more of: a bandwidth requirement, a delay requirement, a jitter requirement, or a packet loss requirement.

8. The apparatus as in claim 7, wherein the one or more traffic flow characteristics identify whether the one or more QoS parameters apply to upstream or downstream traffic.

9. The apparatus as in claim 6, wherein the SFC header comprises a Network Service Header (NSH)-based header, and the one or more traffic flow characteristics are included the NSH-based header.

10. The apparatus as in claim 6, wherein the packet is part of a multiplexed traffic flow.

11. The apparatus as in claim 6, wherein the packet is a multimedia packet.

12. A tangible, non-transitory, computer-readable media having software encoded thereon, the software when executed by a processor configured to:
- determining a classification of a packet using one or more packet classification rules;
- selecting a service function path based on the classification of the packet;
- determining, by the device, one or more traffic flow characteristics based on the classification of the packet, the one or more traffic flow characteristics associated with quality of service (QoS) parameters associated with the packet as the packet travels along the selected service function path;
- generating, by the device, a service function chaining (SFC) header that identifies the selected service function path and the determined one or more traffic flow characteristics, wherein the one or more traffic flow characteristics are included in one or more context header fields of the SFC header and the SFC header is configured to cause a node along the service function path to forward the encapsulated packet based on the identified service function path and the determined one or more traffic flow characteristics; and
- sending, by the device, the packet along the selected service function path as an encapsulated packet that includes the generated SFC header.

13. The tangible, non-transitory, computer-readable media as in claim 12, wherein the one or more QoS parameters identify one or more of: a bandwidth requirement, a delay requirement, a jitter requirement, or a packet loss requirement.

14. The tangible, non-transitory, computer-readable media as in claim 13, wherein the one or more traffic flow characteristics identify whether the one or more QoS parameters apply to upstream or downstream traffic.

15. The tangible, non-transitory, computer-readable media as in claim 12, wherein the SFC header comprises a Network Service Header (NSH)-based header, and the one or more traffic flow characteristics are included in the NSH-based header.

16. The tangible, non-transitory, computer-readable media as in claim 12, wherein the packet is part of a multiplexed traffic flow.

17. The tangible, non-transitory, computer-readable media as in claim 12, wherein the packet is a multimedia packet.

* * * * *